(12) United States Patent  (10) Patent No.: US 7,368,196 B2
Wexel et al.  (45) Date of Patent: May 6, 2008

(54) COLD START PRE-HEATER FOR A FUEL CELL SYSTEM

(75) Inventors: Dirk M. Wexel, Mainz-Kastel (DE); Ralph T. J. Hobmeyr, Mainz-Kastel (DE)

(73) Assignee: General Motors Corporation, Detroit, MI (US)

( * ) Notice: Subject to any disclaimer, the term of this patent is extended or adjusted under 35 U.S.C. 154(b) by 732 days.

(21) Appl. No.: 10/770,863

(22) Filed: Feb. 3, 2004

(65) Prior Publication Data

US 2004/0209135 A1    Oct. 21, 2004

(30) Foreign Application Priority Data

Apr. 3, 2003    (DE) ................................ 103 15 250

(51) Int. Cl.
*H01M 8/04* (2006.01)
(52) U.S. Cl. .......................................... 429/26; 429/39
(58) Field of Classification Search .................. 429/26, 429/39
See application file for complete search history.

(56) References Cited

U.S. PATENT DOCUMENTS

| | | | |
|---|---|---|---|
| 5,605,770 A | 2/1997 | Andreoli et al. | 429/20 |
| 6,383,672 B1 * | 5/2002 | Fujita | 429/26 |
| 7,090,940 B2 * | 8/2006 | Schrooten et al. | 429/26 |
| 2002/0081467 A1 | 6/2002 | Luft et al. | 429/13 |
| 2004/0219401 A1 * | 11/2004 | Hobmeyr et al. | 429/13 |

FOREIGN PATENT DOCUMENTS

| | | |
|---|---|---|
| DE | 10018139 | 12/2000 |
| DE | 19931062 | 1/2001 |
| DE | 19922923 | 2/2002 |
| DE | 10107596 | 10/2002 |
| EP | 0741428 | 11/1996 |
| WO | WO 01/03216 | 1/2001 |

* cited by examiner

*Primary Examiner*—Mark Ruthkosky

(57) ABSTRACT

A fuel cell system with fuel cells displaying cooling channels assembled to form a fuel cell stack, with a coolant cycle in which coolant is circulated by a pump in a main cycle which includes the cooling channels and a cooler and with a heat storage unit and a heating device is characterized by the fact that the heat storage unit is arranged in a branch on the coolant cycle parallel to the cooler, that a heat exchanger that can be heated by the heating device is arranged in a second branch parallel to the heat storage unit, that a second pump in the first branch is arranged in front of the heat storage unit, that a two-way switching valve is provided which displays a first connection arranged in a first branch in front of the second pump, a second connection arranged in the first branch in front of the second pump and a third connection which is arranged in the second branch in front of the heat exchanger, and that a T connection is provided between the first branch, the second branch and the main cycle.

17 Claims, 8 Drawing Sheets

COLD START PRE-HEATER FOR A FUEL CELL SYSTEM

BACKGROUND OF THE INVENTION

The present invention pertains to a fuel cell system with fuel cells displaying cooling channels which fuel cells are combined to form a fuel cell stack, with a coolant cycle in which coolant is circulated by a pump and a main cycle which includes the cooling channels, and with a heat storage unit and a heating device. The invention also pertains to a process for operating such a fuel cell system.

SUMMARY OF THE INVENTION

A fuel cell system of the type mentioned initially is described in DE-OS 101 07 596 A1. There the fuel cell stack is installed in a vehicle in the form of a bus and is equipped with a primary cooling cycle which forms the main cooling cycle, which is operated with deionized water, i.e. with water in a noncurrent-conducting form which is passed into the fuel cells, not only for cooling purposes but also for moistening the process air as well. Since the deionized water freezes at low temperatures with an increase in volume, the cooling cycle and the fuel cells can be damaged. The objective of DE-OS 101 07 596 A1 is therefore to devise a fuel cell device which is protected against frost damage. To solve this problem, it is envisaged there that the fuel cell system include at least one heating device for generating thermal energy and/or at least one heat storage unit for storing at least part of the thermal energy generated in a preceding operating phase of the fuel cells and/or at least part of the thermal energy generated by the heating device, the generated or stored thermal energy being intended for the purpose of direct or indirect heating of at least one of the freezing-endangered substances, at least at low outside temperatures, especially in the case of frost.

The primary cooling cycle is coupled to a secondary cooling cycle via a heat exchanger, the secondary cooling cycle being operated with a conventional antifreeze such as Glysantin, because the conductive coolant is not disturbing there since it does not come into contact with the fuel cells. The secondary cooling cycle is used to heat the interior space of the bus and can also carry off via a cooler heat transmitted from the primary cooling cycle to the secondary cycle.

The heating device for generating thermal energy in DE-OS 101 07 596 A1 is installed in a series connection in the primary cooling cycle. The exact design of the heat storage unit provided there for storing at least part of the thermal energy generated in a preceding operating phase of the fuel cells and/or at least part of the thermal energy generated by the heating device is not reported in detail. Since deionized water is used for the coolant there, at outside temperatures below 0° C. the coolant must also then be heated when the vehicle is not in operation. This may well be acceptable for a bus, since buses are in practically continuous use so that the duration of phases in which no heat is generated is limited, but for a car with frequently long down times this would be rather uneconomical.

For this part of the fuel cell system at temperatures below 0° C. ordinarily the temperature of the fuel cell stack or at least partial regions of the individual cells of each fuel cell stack must be raised to about 0° C. The fuel cells under these non-ideal ambient temperatures operate relatively inefficiently so that spontaneous heating of the fuel cell system no longer takes place quickly enough so that the generation of current upon the starting of the fuel cell system is limited. A rapid rise in the temperature of the fuel cell stack is also desirable for this reason.

Presently there are various approaches for bringing the fuel cell stack to a temperature of about 0° C. and making it possible to operate it even at temperatures below 0° C.

The preheating of the coolant of the fuel cell stack by a heat source utilizing electricity or combustion is disclosed, for example, in DE-OS 101 07 596 A1, but has the disadvantage that coolant and stack must be brought in a short time from a low temperature to operating temperature. For this purpose large heating capacity is required since both the stack and the coolant have a high thermal mass.

The objective of the present invention is to modify a fuel cell system or a process for operating a fuel cell system of the type mentioned initially in such a way that a preheating of the fuel cell stack can be achieved in an energy-efficient manner, in which:

(a) the design of the fuel cell system requires relatively little material, has a small space requirement and achieves high efficiency, (b) the energy requirement is relatively low and can be covered essentially without losing energy, (c) the design satisfies or allows for all relevant operating conditions and (d) the normal operation of the fuel cell system is not disturbed in the slightest.

In order to solve this problem, according to the invention a fuel cell system of the type mentioned initially is envisaged, which is characterized by the fact that the heat storage unit is arranged in a first coolant cycle in a branch parallel to the cooler, that a heat exchanger capable of being heated by the heating device is arranged in a second branch arranged parallel to the heat storage unit, that a second pump is arranged in the first branch in front of the heat storage unit, that a two-way switching valve is provided which displays a first connection which is arranged in the first branch in front of the second pump, a second connection arranged in the first branch after the second pump and a third connection which is arranged in the second branch in front of the heat exchanger, that a T connection is provided between the first branch, the second branch and the main cycle.

According to the invention a process for operating such a fuel cell system is characterized by the following steps:

a) when the fuel cell system is put into operation at temperatures below 0° C. or in the range of 0° C. the second pump is switched on in order to convey coolant through the heat storage unit and introduce it into the fuel cell stack to warm it, b) in the case of an insufficient heat supply through the heat storage unit a flow of heat exchanger is made possible with the heating device switched on by switching the switchable valve, c) during powered operation of the fuel cell system, possibly with the first pump switched on and heat emitted from the main cycle through the cooler, the second pump for charging the heat storage units is switched on with at least one partial stream of the coolant heated in the fuel cell stack and d) when the fuel cell system is switched off or in idling operation at low ambient temperatures the second pump is operated with the heating device switched on and the first pump switched off in order to charge the heat storage unit, in which case the switching valve and T connection are switched for circulation of the coolant in a cycle formed by the first and second branches.

As a result of the fact that the heat storage unit is arranged in a first branch of the coolant cycle parallel to the cooler, it can be operated essentially independently of the main cycle, and it does not interfere with the operation of the main cycle. By this arrangement, the heat storage unit can be arranged directly beside the fuel cell stack so that the quantity of coolant which must be circulated between the heat storage unit and the fuel cell stack in order to transport heat from the heat storage unit to the fuel cell stack is relatively small and no unnecessary quantities of coolant have to be heated up with the limited heat content of the heat storage unit. In other words, one makes certain that the limited heat quantity which can be stored in the heat storage unit can be transmitted efficiently to the fuel cell stack. In this way the quantity of heat stored in the heat storage unit is efficiently utilized, the heat storage unit can be kept smaller, in other words, so that relatively less material is required for the heat storage unit and the space requirement can be kept small. In addition, in this way a higher efficiency is achieved.

The heat storage unit in normal operation of the fuel cell system can be recharged with the waste heat from the fuel cell stack so that energy otherwise lost is utilized which also leads to a higher efficiency.

If the quantity of heat stored in the heat storage unit is not sufficient, e.g., because the ambient temperatures are very low, then the fuel cell stack can be heated directly by switching on the heating device and the heat exchanger. Here also the arrangement of the first and second branches essentially independently of the main cycle is also more efficient. The heating device and heat exchanger can also be installed in the immediate vicinity of the fuel cell stack. Since these additional heating possibilities are provided, the heat storage unit can be designed to be relatively small so that material and space are also saved. The heating device itself, for example, can also be operated with hydrogen which is formed as the evaporation loss from a low temperature storage unit. Although such evaporation losses can be minimized they are never totally excluded. Therefore if such losses are utilized for operating the heating device, then the heating effect is covered by energy which would otherwise be lost. This possibility can also be utilized totally independently of the operation of the fuel cell system so that, for example, in the case when heat losses occur in the heat storage unit when the vehicle stands for a long time, the heat storage unit can always be recharged by the heating device. Since the heating device and the heat storage unit are arranged close together and are operated independently of the main cycle, this heating process is also highly efficient.

In the case of very low ambient temperatures and/or very short traveling distances the situation can arise that sufficient heat is no longer present in the heat storage unit to enable restarting the fuel cell system under cold environmental conditions. For this purpose the heating device provides assistance since it can be operated independently of the fuel cell system. If the evaporation losses present are not sufficient to operate the heating device then the said device can also be powered by fuel from the low temperature storage unit.

Due to the fact that the heat storage unit as well as the heating device are arranged in parallel branches of the cooling cycle, they can be operated essentially independently of the normal operation of the fuel cell system, and therefore the normal operation of the fuel cell system is not disturbed in the slightest.

It is especially favorable if the T connection is realized with a T-piece. This represents a very economical possibility which also functions flawlessly. But is even more favorable if the T connection is realized by a second switching valve since in this way an even more secure separation of the first and second branches of the main cycle of the coolant is achieved. It is especially favorable if the T connection is realized by means of a regulating valve, preferably with a switching function. This makes it possible to operate the heating device simultaneously with the discharging of the heat storage unit so that both heat sources are available for heating the fuel cell stack, and the feeding of heat into the fuel cell stack can be optimally regulated.

The device according to the invention can be connected to the main cycle in such a way that the inlet of the first branch or the first connection of the reversing valve is connected to the forward flow line of the main cycle in front of the fuel cell stack. However it is even more favorable if the inlet of the first branch or of the first connection of the first switching valve on the back flow line of the coolant cycle is connected after the fuel cell stack since in this way the temperature of the coolant running into the heat storage unit is somewhat higher and more heat can be stored in the heat storage unit. In addition then the flow through the fuel cell stack during heating by heat from the heat storage unit or from the heating device corresponds to the normal flow direction in normal operation.

Especially preferred variants of the fuel cell system according to the invention or of the process according to the invention can be derived from the following description of preferred examples of embodiment with reference to the drawings.

DESCRIPTION OF THE PREFERRED EMBODIMENT

Figure 1:
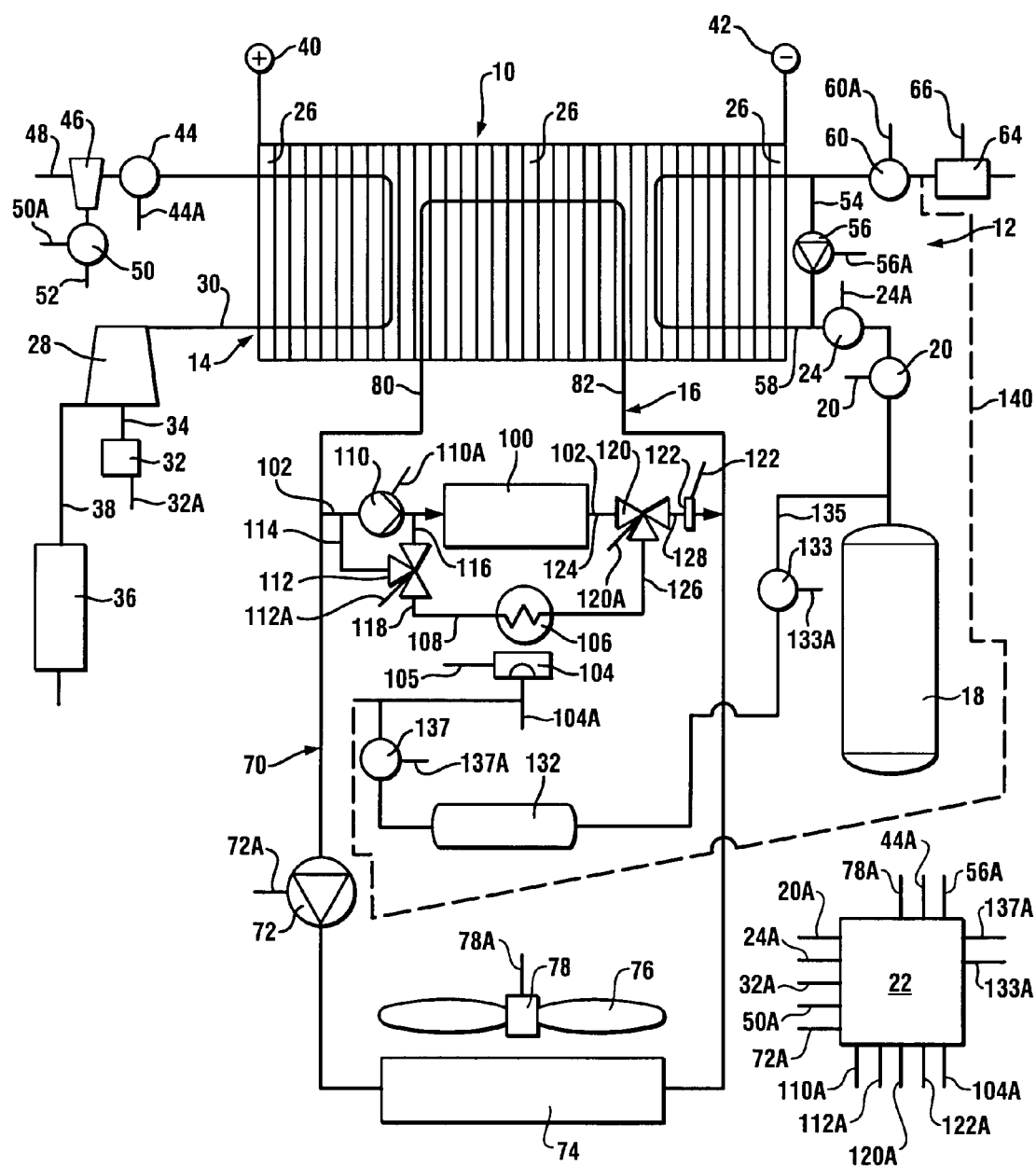
FIG. 1 shows a schematic representation of a fuel cell system which is designed according to the invention and is hooked up in such a way that the system can be started from the cold state.

FIG. 1 shows a schematic representation of a fuel cell system consisting of a fuel cell stack 10 with an anode side 12 and a cathode side 14. In addition the fuel cell system displays a coolant cycle 16 which is filled with an insulating coolant which, depending on where the fuel cell system is operated, does not freeze at the maximally anticipated negative temperatures there, i.e. does not pass into a solid state.

On the anode side 12 a fuel such as hydrogen or a hydrogen-rich synthetic gas is stored in a low temperature storage unit 18 or another suitable pressurized storage unit. The reference number 20 denotes a valve which serves to reduce the pressure in the storage unit 18 to a low storage pressure. The valve 20 is activated by a control 22 via a conduit 20A. In order to simplify the representation the curve of the control conduit 20A between the valve 20 and the control 22 is not shown, but it should be understood that the tap line 20A on the valve 20 is connected to the tap line 20A on the control 22. This is also true for all other tap lines which are drawn-in in FIG. 1, i.e. all tap lines which lead to a component in the drawing are provided with the same reference numbers as the component itself, but with the added-on suffix "A" and accordingly the tap line on the control 22 is identified by the corresponding reference number.

The valve 20, for example, can be a valve which not only operates as a pressure reducing valve but also displays a cut-off function which can be triggered via the control conduit 20A.

On the anode side 12 the fuel or the hydrogen is passed from the pressure reducing valve 20 to a control valve 24 which is connected via a tap line 24A to the control 22 where the control 22 determines the setting of the valve 24 so that the necessary quantity of fresh hydrogen or fuel can be supplied to the anode side 12 of the fuel cell system. The hydrogen or fuel supplied to the fuel cell system delivers protons to the individual fuel cell cells 26 of the fuel cell stack 10 and the latter migrate through the membrane provided there (not shown) to the cathode side 14.

The cathode side 14 is supplied with air oxygen by conventional means via compressor 28 and conduit 30. The air compressor 28 is driven by an electric motor 32 via a shaft 34 and draws air through the air filter and the noise muffler 36 and the conduit 38. The electric motor 32 has electrical connections (not shown) and a control line 32A which is connected to the control 22. The protons which diffuse through the membrane of the individual fuel cells 26 react on the cathode side 14 of the fuel cell stack 10 with oxygen molecules which are delivered by the compressor 28 and by this reaction generate steam or water vapor as well as electric power which can be tapped off at the terminals 40 and 42 of the fuel cell stack. This electric power is used in the case when the fuel cell system is installed in a car for supplying power to an electric motor or turboelectric motor to drive the vehicle. Part of the electric power can be used for other purposes, e.g., to drive the electric motor 32. The reference number 44 denotes a valve on the cathode side 14 of the fuel cell system which governs the operating pressure on the cathode side. In order to regulate valve 44 the latter displays a control line 44A which is also connected to the control 22. The cathode-side exhaust gases which consist primarily of unburnt air oxygen, water vapor, nitrogen and water droplets can be released to atmosphere directly without problem since these exhaust gases are natural components of air. Ordinarily the water droplets, however, are collected in a water separating device 46 before the remaining exhaust gases flow out into the environment through the conduit 48.

The reference number 50 denotes a valve which can be modulated via a tap line 50A in order to bleed off the collected water through conduit 52 or to supply it for another use.

On the anode side 12 of the fuel cell stack 10 is a return flow line 54 which leads via a pump 56 to the anode inlet 58. In this way the anode exhaust gases consisting primarily of unburned hydrogen, nitrogen and steam can again pass through the fuel cell stack so that better utilization of the supplied hydrogen can be achieved. The rotation speed of the pump 56 and therefore its conveying capacity can be determined via conduit 56A by the control 22. The reference number 60 denotes a drain valve which can be modulated to operate continuously or discontinuously in order to remove part of the anode-side exhaust gases from the anode cycle. Since these gases also have a content of hydrogen, and since the hydrogen cannot be drained off unobjectionably into the environment, the bled-off anode side exhaust gases are guided through a burner 64, usually a catalytic burner, which receives oxygen or air through conduit 66 and thereby assures that the hydrogen and oxygen will combine with each other to form water which can be released without objection, in which case, if desired, also part of this water can be collected in a water separating device. The remaining cathode exhaust gas, i.e. steam, water droplets and nitrogen can be released to atmosphere without objection since they are natural components of the ambient air. The nitrogen contained in the anode exhaust gases is therefore to be found on the anode side, because it diffuses through the membrane of the fuel cells to the anode side as also does the water present on the cathode side.

The coolant cycle 16 consists of a main cycle 70 which contains a pump 72 and a cooler 74. In the representation of FIG. 1 the pump 72 draws hot coolant into the return flow line 80 of the main cycle 70 and conveys it in operation through the cooler 74 and after corresponding cooling subsequently via the forward flow line 82 back to the fuel cell stack 10. The reference number 76 denotes a cooling blower which is driven by the electric motor 78 which in turn receives electric power from the fuel cell system via conduits, not shown, i.e. part of the electric power which is obtained from the terminals 40 and 42, and is also regulated in its rpm via control line 78A by the control system 22. By controlling the rpm of the pump 72 via the control line 72A and controlling the rpm of the electric motor 78 and therefore of the air blower 76 via the control line 78A the desired cooling power of the main cycle 70 can be determined by the control 22. The fuel cell system as described above is well known already and numerous possible modifications can be realized which are not important here since they have nothing to do with the present invention which deals with the cooling cycle.

It should only be pointed out that the individual fuel cells consist of a so-called membrane electrode unit (so-called MEA) which in each case are arranged between two bipolar plates. The bipolar plates which are frequently realized from two plates lying flatly against each other have cooling channels in their interior through which the coolant circulates in order to keep the individual fuel cells in a desired operating temperature range. The design of the fuel cells and the cooling channels provided inside the bipolar plates is already known from a large number of patents, including DE 101 28 836 A1 and will therefore not be described further here.

The reference number 100 denotes a heat storage unit which is arranged in a first branch 102 of the coolant cycle 70 parallel to the cooler 74, i.e. the parallel branch 102 of the coolant cycle 70 extends between the return flow line 80 and the forward flow line 82. A heat exchanger 106 capable of being heated by the heating device 104 is arranged in a second branch 108 parallel to the heat storage unit 100. In addition in the first branch 102 a second pump 110 is located which is arranged in front of the heat storage unit. The reference number 112 denotes a two-way switching valve which displays a first connection 114 arranged in the first branch 102 in front of the second pump 110, a second connection 116 arranged in the first branch 102 after the second pump 110, and a third connection 118 which is arranged in the second branch 108 in front of the heat exchanger 106. The T connection 120 is arranged between the first branch 102 and the second branch 108 and the main cycle 70. As shown in the figures the T connection 120 is formed by a second switching valve which is connected via control line 120A to the control system 22 so that the switching valve 120 can be switched back and forth from the control unit 22. Although here the T connection 120 is realized by a reversing valve, instead of this a pure T connection can be involved, i.e. a T-piece.

The switching valve 112 also has a control line 112A which is connected to the control system 22 so that this valve also, depending on the operating state can be switched back and forth by the control 22.

The reference number 122 denotes the temperature sensor which is arranged elsewhere inside the cooling cycle, e.g., in the forward flow line 82.

FIG. 1 shows a discharge process of the heat storage unit 100 in the case of a cold start of the fuel cell system. In this case the second pump 110 is put into operation by a control line 110A and circulates coolant through the heat storage unit 100, through the switching valve 120, the forward flow line 82, to the fuel cell stack 10 and the return flow line 80. This mode of operation presumes that the heat storage unit 100 previously had heat stored in it which is now absorbed by the coolant and can be used for heating the fuel cell stack. In this case the actual temperature of the coolant is registered via the sensor line 122A by the control unit 22 and referred to for controlling the system. Besides absorption of heat from the storage unit warm coolant is displaced from the heat storage unit. This in turn displaces cooler medium out of the cooling channels of the fuel cell stack which in turn replaces the coolant in the storage unit.

In this cold starting process the first pump 72 is not operating, i.e. there is no modulating signal present on the control line 72A. In this way the first pump 72 acts as a blocking valve and prevents coolant from flowing in the main cycle through the pump 72 and the cooler 74.

During this cold starting process the switching valve 112 and the control line 112A are switched by the control unit 22 in such a way that the first connection 114 is connected to the third connection 118 and the second switching valve 120 is switched via the control line 120A by the control system in such a way that a connection is present between its first connection 124 and its third connection 128. Flow through the second branch 108 is suppressed in this way. This means that the quantity of heat which is available in a heat storage unit 100 is used exclusively for heating up the coolant which is in the cooling cycle in the fuel cell system 10 and the first branch of the cooling cycle, i.e. the heat available in the heat storage unit 100 is limited to a small quantity of coolant so that the maximal heating of the fuel cell stack 10 is achieved with the available quantity of heat. The heat storage unit 100 is discharged until the temperature sensor 122 detects a temperature of, e.g., 0° C. The cold start of the fuel cell system or of the fuel cell stack 10 can take place in parallel with the discharge of the heat storage unit or only after the heating up of the fuel cell system to a preassigned temperature such as 0° C. In order to be able to start the fuel cell stack then hydrogen must be supplied to it from the storage system 18 and air from the compressor 28 by known methods. Upon the starting operation of the fuel cell stack 10 the latter generates additional heat also so that the fuel cell stack 10 is brought up to operating temperature.

If the quantity stored in the heat storage unit 100 is not sufficient to bring the fuel cell stack 10 to the preassigned temperature, e.g., 0° C., e.g., because part of the stored heat has escaped over a corresponding time interval due to the fact that the heat storage unit 100 is not large enough for the quantity of heat stored there alone to be able to supply the heat necessary for the initial warming of the fuel cell stack, then the system is adjusted by the control system 22 in such a way that a partial stream or the complete stream of coolant is passed through the heat exchanger 106.

Figure 2:
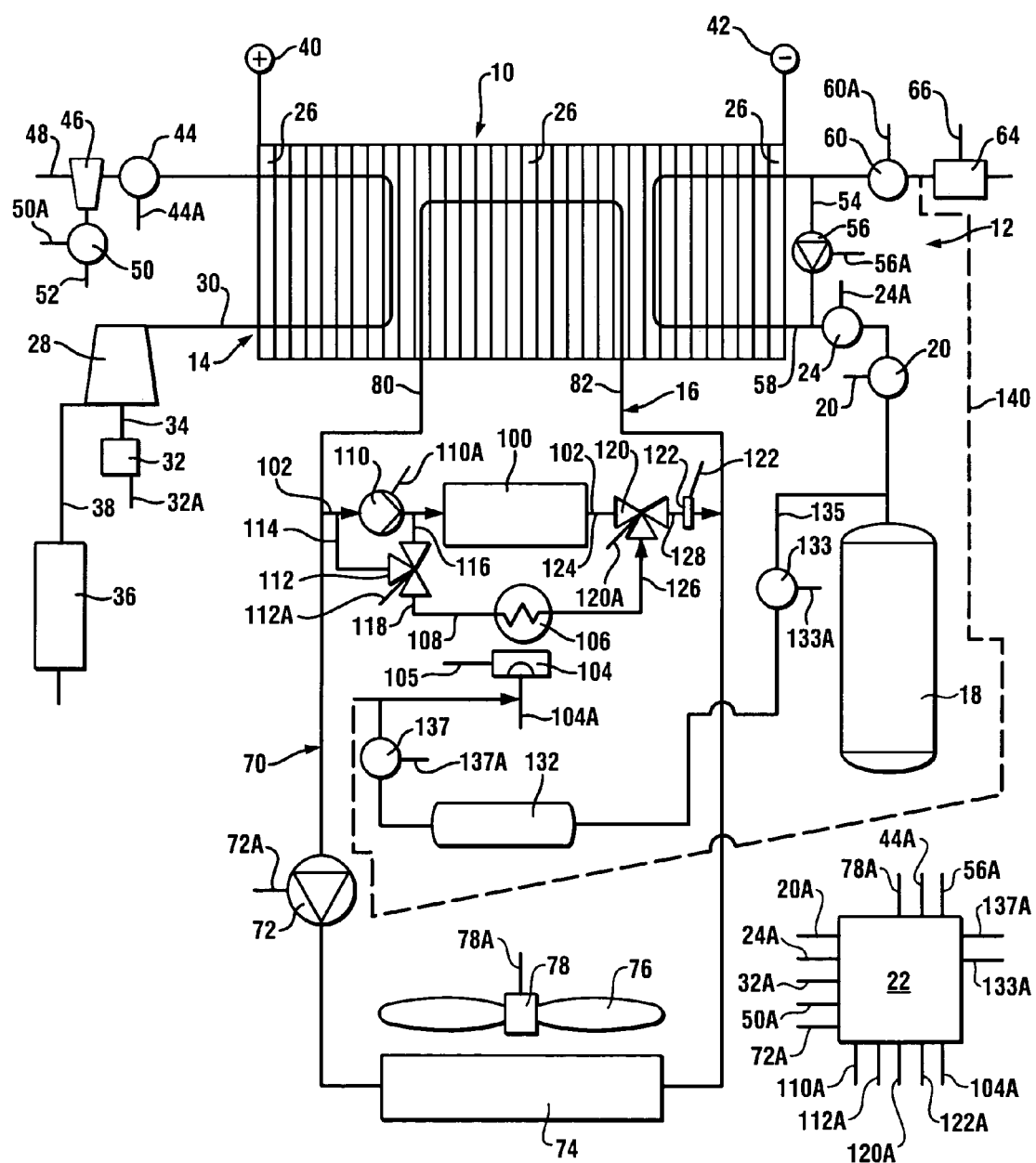
FIG. 2 shows the same design as FIG. 1 but in the switching state in which the heat is introduced from the heating device into the fuel cell stack.

At the same time heat is supplied via the heating device 104 to this partial stream or complete stream of coolant. In order to realize this in operation as indicated in FIG. 2, the pump 72 remains in the switched-off phase so that no flow through the cooler 74 takes place. On the other hand, the switching valve 112 is switched via the control system 22 in such a way that the second connection 116 communicates with the third connection 118. At the same time the switching valve 120 is switched in such a way that both the first connection 124 and also the second connection 126 communicate with the third connection 128 so that the switched position of the switching valve 120 determines the ratios of the flow through the first branch 102 and the flow through the second branch 108, i.e. partial streams may flow through both branches. Such a flow through the two branches also takes place when a simple T connection is used instead of a variable switching valve.

Another possibility is to switch the switching valve 120 in such a way that only its second connection 126 communicates with its third connection 128 and this guides the coolant stream during operation of the pump 110 exclusively through the heat exchanger 106 and the second branch 108 but not through the heat storage unit 100. The heating device 104, in the case when liquid hydrogen is used in the fuel storage system 18, is preferably supplied through conduit 130 with hydrogen or fuel which is formed as the evaporation losses of the fuel storage unit 18, in which case this evaporation loss can be stored immediately if necessary in a storage unit 132. The reference number 133 indicates a valve which only opens when the evaporation losses have led to a preassigned excess pressure in the conduit 135, while the valve 137 with the control line 137A actuates the switching on and off and regulation of the fuel supply to the heating device 104. The heating device 104 can also be fed directly with fuel from the storage unit 18, e.g., if the evaporation losses are not sufficient.

If necessary the heating device 104 can be designed differently, e.g., for heating the coolant by means of electrical heating power which comes from a battery or is generated in the operation of the fuel cell. In this operating mode also the quantity of heat delivered by the heating device 104 is concentrated on the coolant which circulates directly in the fuel cell stack 10 and in the second branch of the coolant cycle so that a highly efficient heat transfer to the fuel cell stack 10 takes place, above all when the forward flow and backward flow conduits 82, 80 are kept short and the first and second branch 102, 108 of the coolant cycle 70 are arranged in the immediate vicinity of the fuel cell stack 10.

Figure 3:
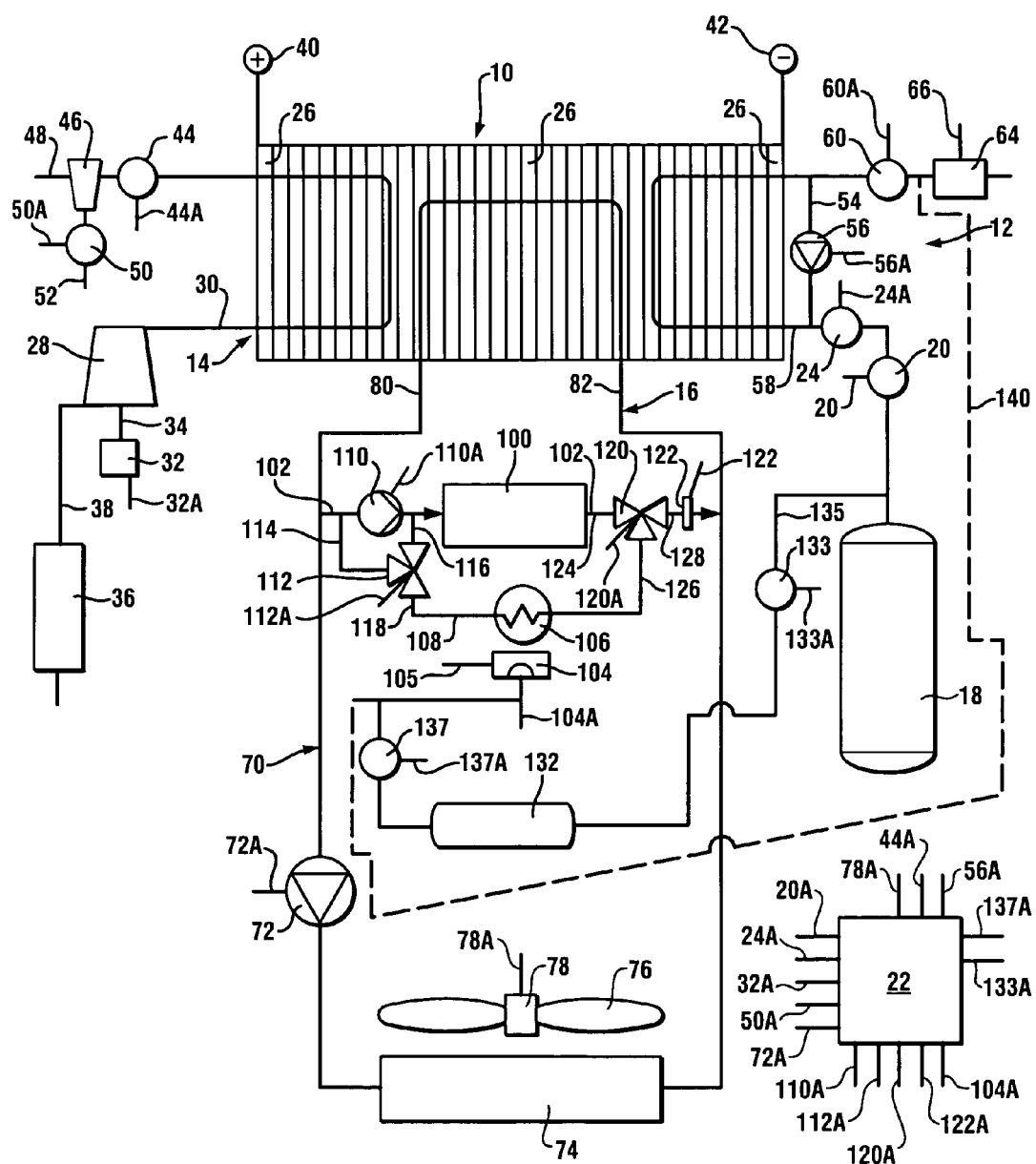
FIG. 3 shows the same design as FIGS. 1 and 2 but in normal operation of the fuel cell system, FIG. 4 again shows the same design as in FIGS. 1 to 3, but here after the recharging of the heat storage unit in a state in which the fuel cell system itself is not in operation.

Here also upon reaching a preassigned temperature which is determined by the temperature sensor 122 and the control unit 22 via the conduit 122A, the heating device 104 is switched off, which can involve application of the control line 137A and possibly a control line 104A. In addition, the possibility exists of supporting the vehicle interior heating system which is arranged in the coolant cycle, for example, via a heat exchanger parallel to the cooler 74 and fuel cell stack 10. The heat is withdrawn for this purpose through the primary side of the heat exchanger to the coolant and supplied to the air which is fed into the interior space of the vehicle. This heat exchanger (vehicle interior heating) with a regulating valve interposed in front of it is thus also wired parallel to the cycle 102. The heat generated by the electric heater or a burner can thus be utilized to raise the temperature of the coolant cycle 70 above 0° C. for reasons of comfort also. A permanent operation of the electric heater or burner to cover the heating heat requirement in the case of a low fuel cell load is also conceivable. When the heating up of the fuel cell stack 10 by the heat stored in the heat storage unit 100 or additionally or simultaneously by the heating power supplied by the heating device 104 has been completed, the heat storage unit 100 is in the empty state and must be recharged. For recharging the heat storage unit 100 the system is switched over as FIG. 3 shows, i.e. the second pump 110 is supplied with coolant from the return flow line 80 to the heat storage unit 100, while the coolant contained in the return flow line 80, now hot since the fuel cell stack 10 is in operation, serves to heat up the heat storage unit 100 and fill the latter with heat again. The coolant emerging from the heat storage unit 100 is then fed into the forward flow line 82 and heated up again in the fuel cell stack 10. For this process the pump 72 can first remain closed since the heat storage unit 100 absorbs the heat and assures the necessary cooling of the fuel cell stack 10.

Alternatively to this the pump 72 in addition to the pump 110 can be put into operation so that only a partial stream flows through the first branch 102, the magnitude of this partial stream being determined by the set ratio of the conveying power of the pump 72 and of the second pump 110 in each case. Since a flow through the second branch 108 is rather undesirable in the case of charging of the heat storage unit 100, the switching valve 112 is preferably switched in such a way that the first connection 114 again communicates with the third connection 118. The second switching valve 120 is switched in such a way that the flow proceeds from its first connection 124 to its third connection 128. In this case a flow through the second branch 108 can no longer take place.

The heat storage unit 100 is preferably designed in such a way that the temperature of the coolant in the storage unit in the case of a parking time of, e.g., ca. 4-8 days, depending on the outside temperature, does not drop below 0° C. The storage unit can be a heat-insulated storage unit or a latent heat storage unit although combined heat-insulated and latent heat storage units exist which can also be used here. With both principles the problem of storage discharge arises. The isolated storage unit has continuous heat loss, the latent heat storage unit discharges suddenly when the temperature drops below a certain temperature.

Figure 4:
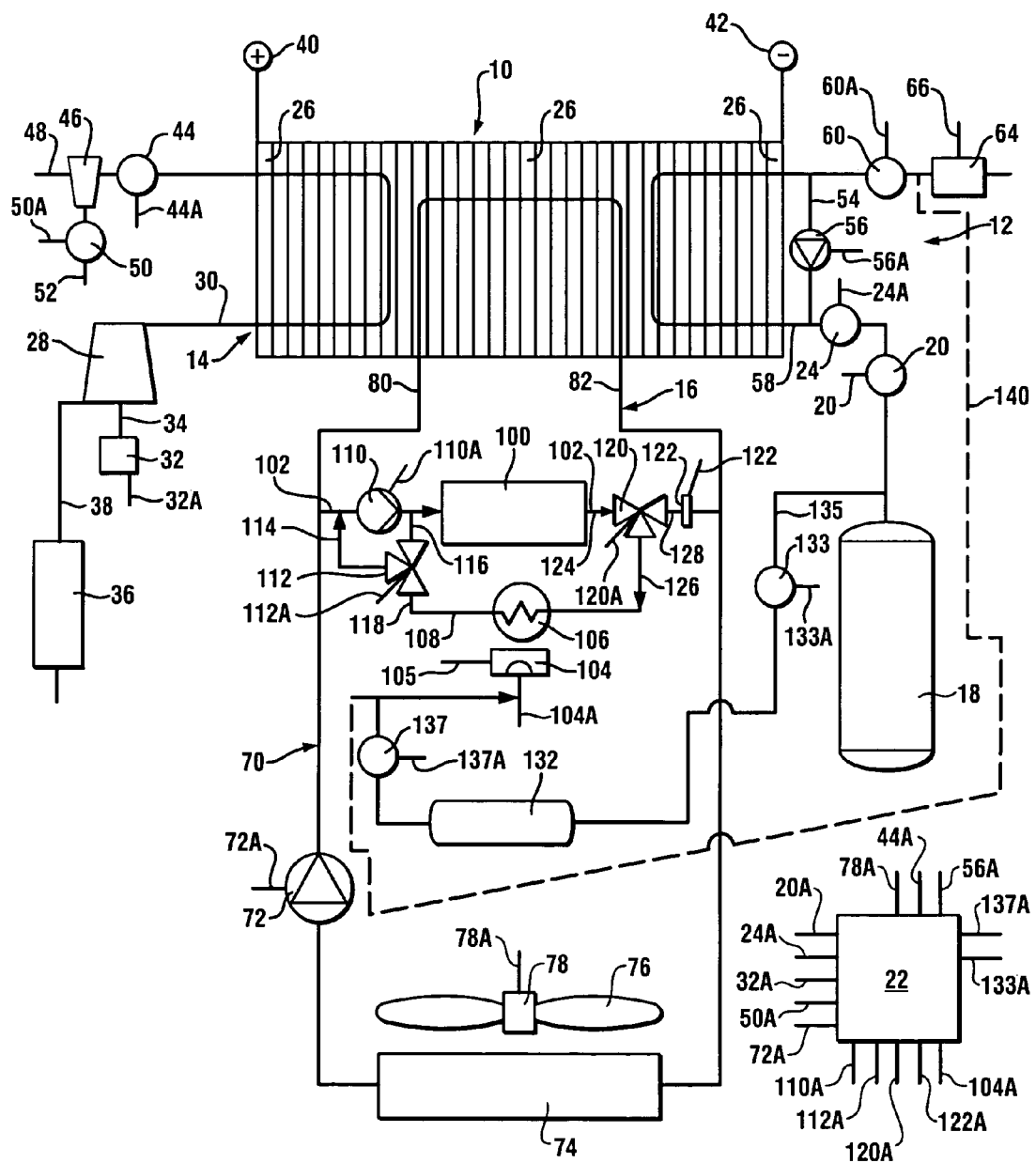
Figure 5:
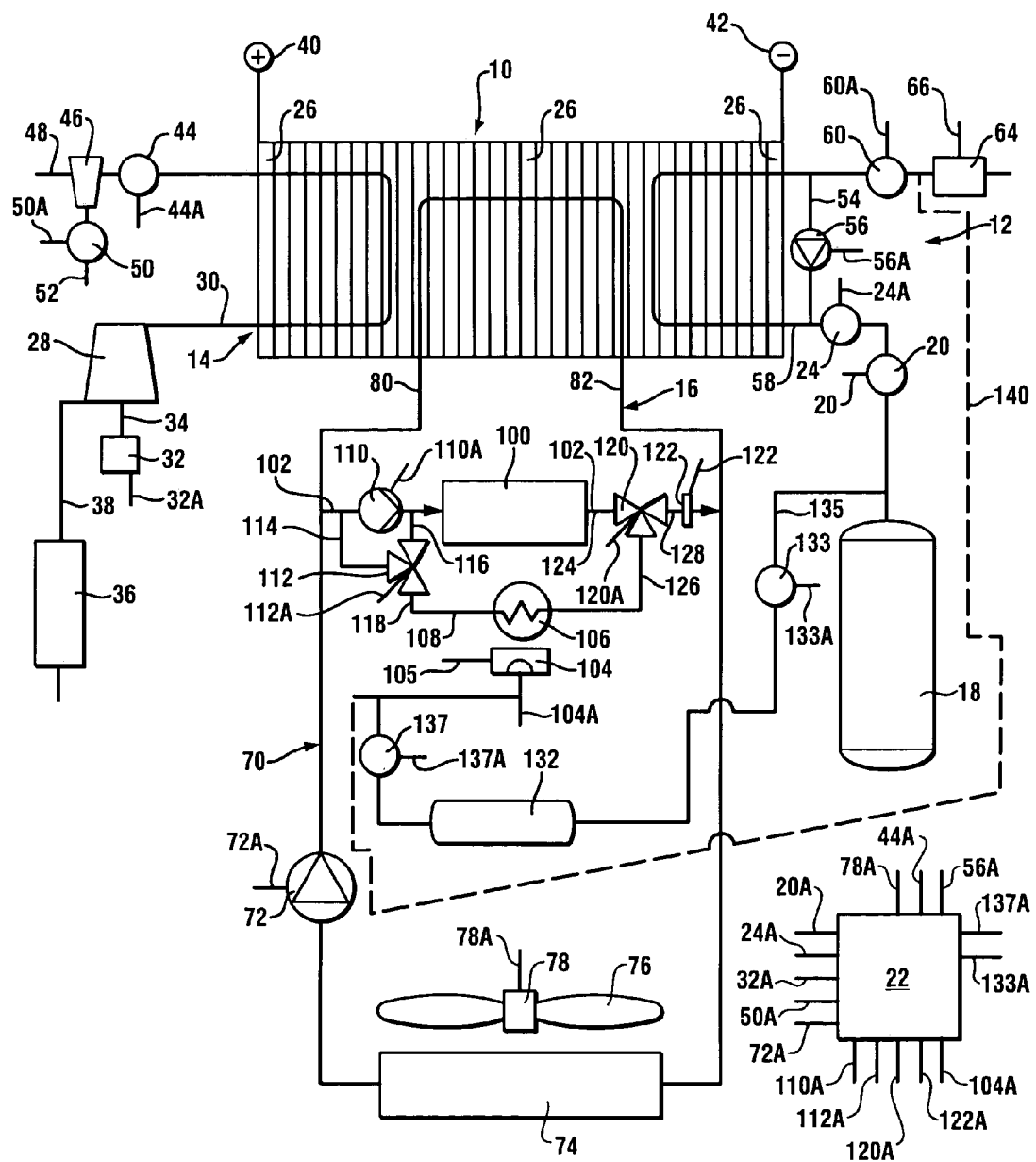
FIGS. 5-8 show another variant which corresponds to the design according to the invention shown in FIGS. 1 to 4 but in which the inlet of the first branch and the connection of the switching valve is connected to the forward flow line of the main cycle of the fuel cell stack instead of its return flow line.
Figure 6:
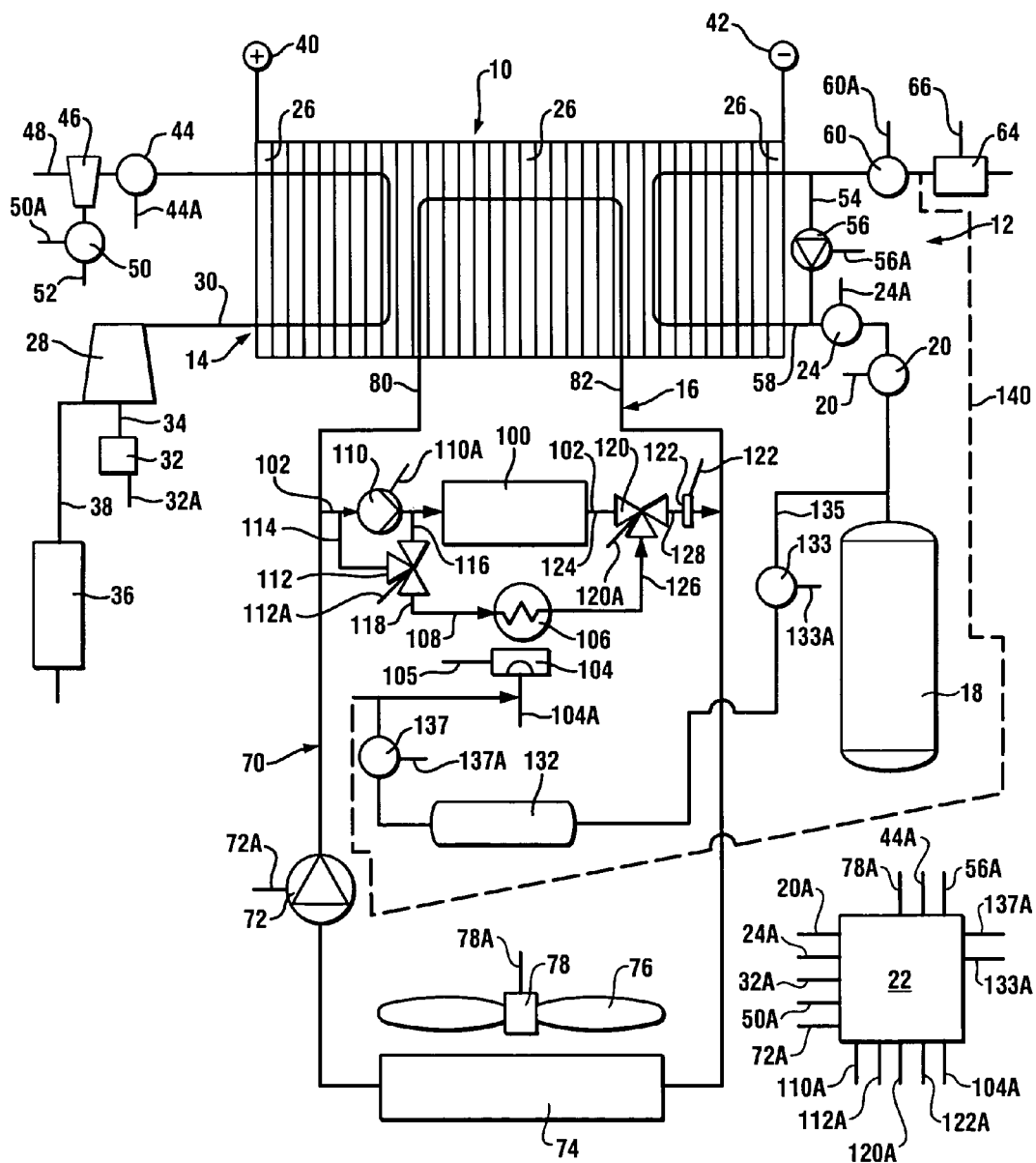
Figure 7:
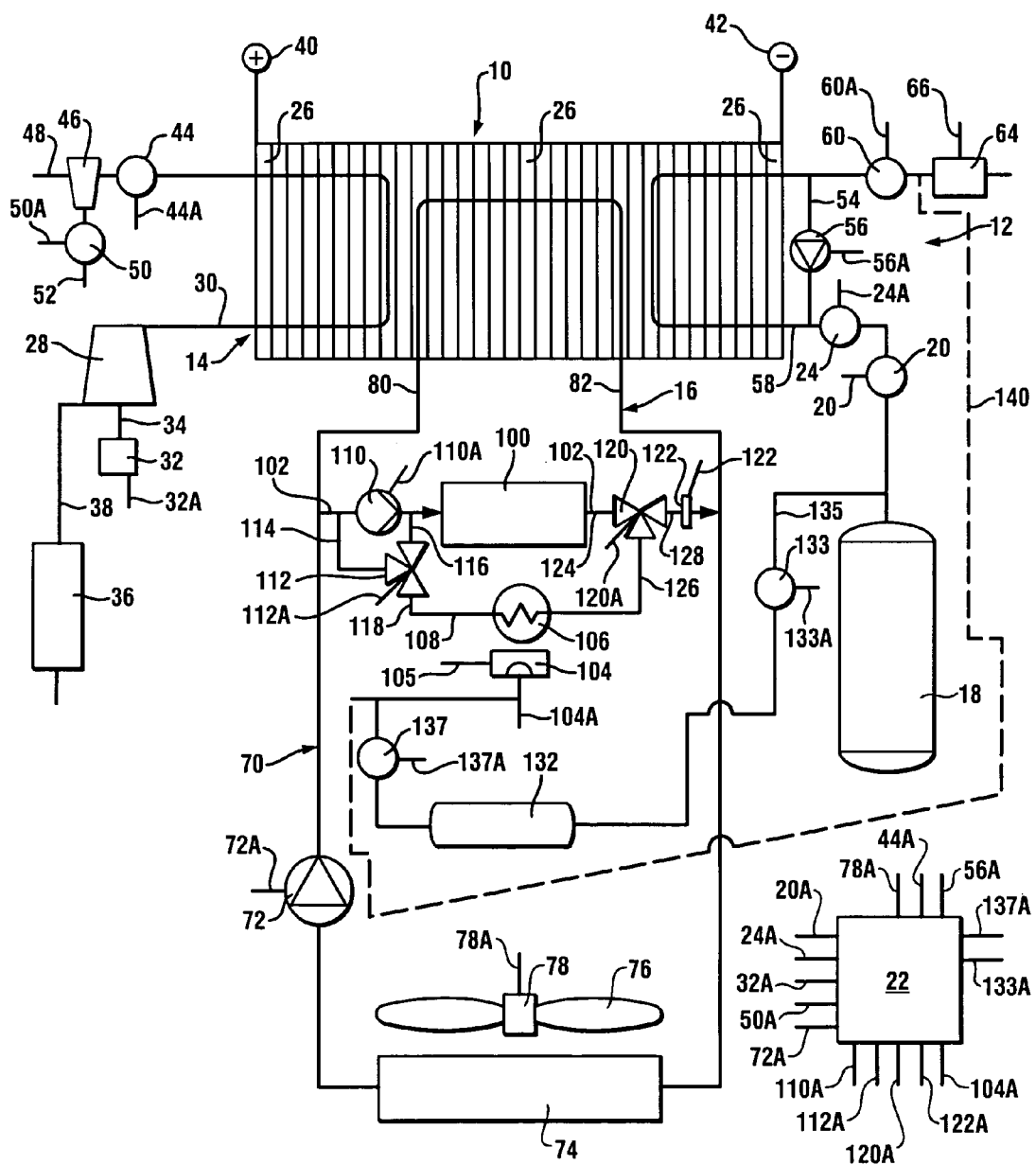
Figure 8:
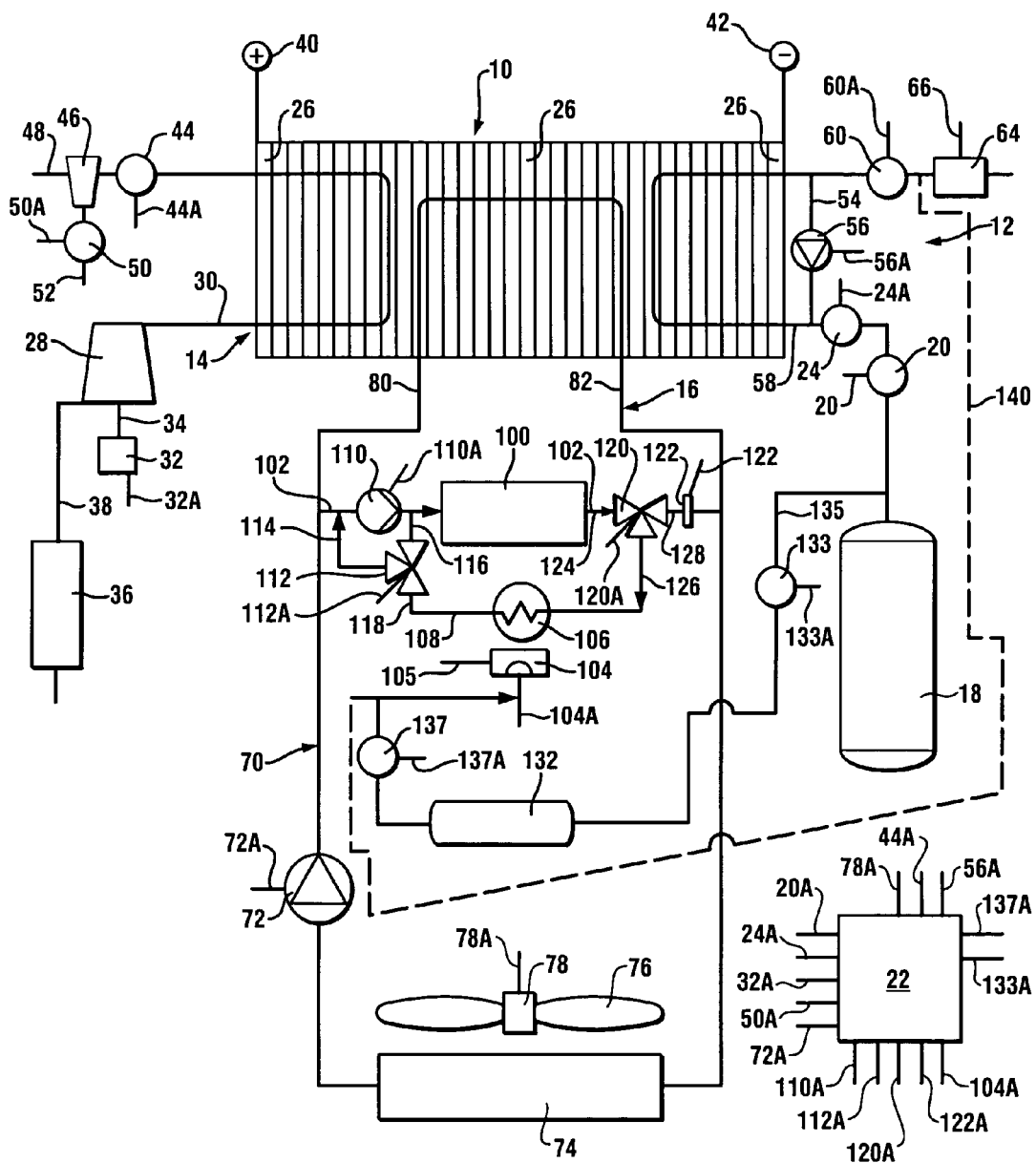

In order to avoid this disadvantage, all storage types can be recharged as shown in FIG. 4. As the heat source the heating device 104 here is preferably a hydrogen burner. The hydrogen required for this, for example, can be supplied by the evaporation losses of the liquid water in the liquid hydrogen tank 18 as described in connection with FIG. 2.

Due to the charging operation of the heat storage unit 100 the switching valves 112 and 120 are switched in the manner indicated in FIG. 4. Specifically the first connection 114 of the switching valve 112 is switched to its third connection 118 so that the pump 110 draws coolant through the heat exchanger 106 and feeds it to the heat storage unit 100. A flow through the second connection 116 of the switching valve 112 is impossible because of the switched position of the switching valve 112.

The switching valve 120 in this example is switched in such a way that its first connection 124 is connected to its second connection 126 so that coolant emerging from the heat storage unit 100 and having given off heat in the heat storage unit 100, in turn, is drawn through the heat exchanger 106, warmed at this time and fed back into the heat storage unit 100. It can be seen that the coolant cycle in this operating mode is limited to the first branch 102 and the second branch 108 so that here also only a limited quantity of coolant is used, and the heat from the heating device 104 is transferred to the coolant very economically. In other words the available fuel in the storage unit 132 is economically utilized.

The heating device 104, in addition to the functions described above, can also be used for the purpose of emission treatment. For example, hydrogen emissions which are released through valves 60 in the case of continuous or discontinuous bleed-off of the anode exhaust gases, instead are burned in a separate burner 64 in the heating device 104. In this way the burner 64 can be omitted. This possibility is shown by the broken line 140 in FIG. 4. In this case the heating device 104 which is designed as a catalytic burner has the purpose of reacting the hydrogen emissions into $H_2O$ so that these reaction products can be discharged to atmosphere unobjectionably.

The fuel cell system shown in FIGS. 1-4 represent the best known possibility for implementing the present invention, because the second branch leads from the return flow line 80 to the forward flow line 82. This means that the heat storage unit 100 is always supplied with coolant with the highest temperature level and therefore can store the maximum quantity of heat. However, it would be entirely possible to operate the fuel cell system in a "mirrored" arrangement, i.e., in an arrangement where the pump 110 takes coolant from the normal supply line to the fuel cell stack and feeds the heated coolant into the normal return flow line. This means that the flow through the fuel cell stack in start-up operation using the heat from the heat storage unit 100 is fed in the opposite direction to the normal flow direction which is used when the pump 72 is operating. This optional arrangement which is shown in FIGS. 5-8 can be considered but has the disadvantage that the coolant supplied to the heat storage unit 100 during the storage of heat is somewhat colder than in the arrangement shown in FIGS. 1-4.

The fuel cell system in FIGS. 5-8 is so similar to the fuel cell system in FIGS. 1-4 that a separate description of FIGS. 5-8 is unnecessary. It is to be understood that all reference numbers used in FIGS. 1-4 are also found in FIGS. 5-8 and denote the same parts which were described previously in connection with FIGS. 1-4. In addition these parts also have the same functions as were described previously. In the representation of FIGS. 5-8 fundamentally only the direction of rotation of the pump 72 and the exchange of the forward flow and backward flow lines 80 and 82 respectively are shown differently from those in FIGS. 1-4.

The invention claimed is:
1. Fuel cell system comprising:
   a fuel cell stack including fuel cells defining cooling channels; and
   a coolant cycle in communication with the cooling channels and including:
      a main cycle having a cooler and a first pump to circulate coolant,
      a first branch in parallel with the cooler and including:
         a heat storage unit,
         a second pump upstream of the heat storage unit,
         a valve with a first connection arranged in the first branch upstream of the second pump, a second connection arranged in the first branch downstream of the second pump, and a third connection, a second branch in parallel with the heat storage unit and including a heat exchanger, wherein the third connection of the valve is arranged in the second branch upstream of the heat exchanger, and a three-way connection in communication with the first branch and the second branch and the main cycle.

2. Fuel cell system according to claim 1, wherein the three-way connection is a T-shaped piece.

3. Fuel cell system according to claim 1, wherein the three-way connection is a switching valve.

4. Fuel cell system according to claim 1, wherein the three-way connection is a regulating valve, optionally with a switching or reversing function.

5. Fuel cell system according to claim 1, wherein the coolant cycle includes a return flow line and an inlet of the first branch is connected to the return flow line.

6. Fuel cell system according to claim 1, wherein the coolant cycle includes a forward flow line and an inlet of the first branch is connected to the forward flow line.

7. Fuel cell system according to claim 1, wherein a temperature sensor is arranged in the coolant cycle.

8. Fuel cell system according to claim 7, wherein the temperature sensor is provided in the first branch between the three-way connection and the main cycle.

9. Fuel cell system according to claim 1, wherein the heating device is a burner.

10. Fuel cell system according to claim 9, wherein the burner is a catalytic burner.

11. Fuel cell system according to claim 9, wherein the burner operates with flame combustion.

12. Fuel cell system according to claim 1, wherein the heating device can be fed with evaporation losses of a low-temperature storage system for a gaseous fuel present as a liquid.

13. Fuel cell system according to claim 12, wherein the heating device is connected to a line which leads to a vapor pressure relief valve of a low temperature storage unit which can open into a storage container to which the line is connected.

14. Fuel cell system according to claim 1, wherein the heat storage unit is a heat-insulated heat storage unit.

15. Fuel cell system according to claim 1, wherein the heat storage unit is a latent heat storage unit.

16. Fuel cell system according to claim 1, wherein the heat storage unit is formed by a combination of a heat-insulated heat storage unit and a latent heat storage unit.

17. Fuel cell system according to claim 1, further comprising a valve for continuous or discontinuous release of at least part of exhaust gases accumulating on an anode side of the fuel cell stack, wherein an outlet of the valve is connected directly or indirectly to an inlet of the heating device.

* * * * *